United States Patent [19]
Hu et al.

[11] Patent Number: 5,843,607
[45] Date of Patent: Dec. 1, 1998

[54] INDOLOCARBAZOLE PHOTOCONDUCTORS

[75] Inventors: Nan-Xing Hu, Oakville; Beng S. Ong, Mississauga, both of Canada

[73] Assignee: Xerox Corporation, Stamford, Conn.

[21] Appl. No.: 942,752

[22] Filed: Oct. 2, 1997

[51] Int. Cl.$^6$ .................................................. G03G 5/47
[52] U.S. Cl. ............................................. 430/59; 430/79
[58] Field of Search ................................. 430/58, 59, 79

[56] References Cited

U.S. PATENT DOCUMENTS

| | | | |
|---|---|---|---|
| 3,121,006 | 2/1964 | Middleton et al. | 96/1 |
| 3,888,665 | 6/1975 | Wiedemann | 430/59 |
| 3,973,959 | 8/1976 | Rochlitz et al. | 430/59 |
| 4,265,990 | 5/1981 | Stolka et al. | 430/59 |
| 4,367,274 | 1/1983 | Leichter et al. | 430/59 |
| 4,555,463 | 11/1985 | Hor et al. | 430/59 |
| 4,587,189 | 5/1986 | Hor et al. | 430/59 |
| 5,473,064 | 12/1995 | Mayo et al. | 540/141 |
| 5,482,811 | 1/1996 | Keoshkerian et al. | 430/135 |
| 5,493,016 | 2/1996 | Burt et al. | 540/139 |

*Primary Examiner*—John Goodrow
*Attorney, Agent, or Firm*—E. O. Palazzo

[57] ABSTRACT

A photoconductive imaging member comprised of a charge transport layer comprised of an indolocarbazole represented by the Formulas (Ia), (IIa), (IIIa), (IVa), (Va), or (VIa); or optionally mixtures thereof:

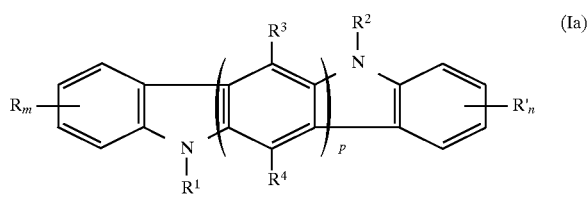

(Ia)

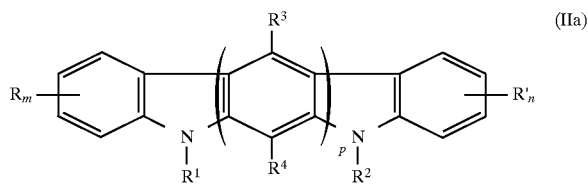

(IIa)

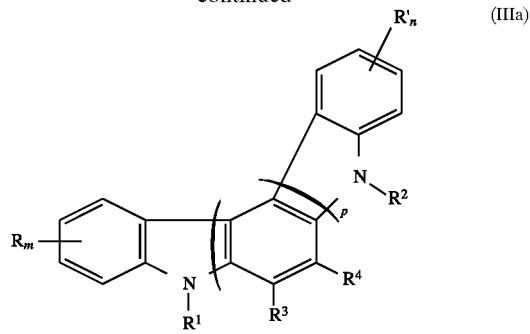

(IIIa)

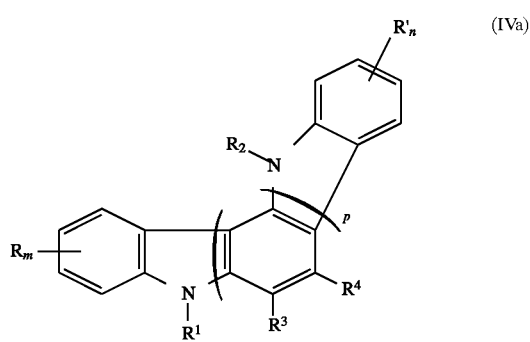

(IVa)

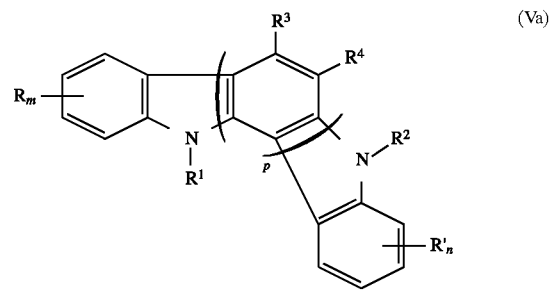

(Va)

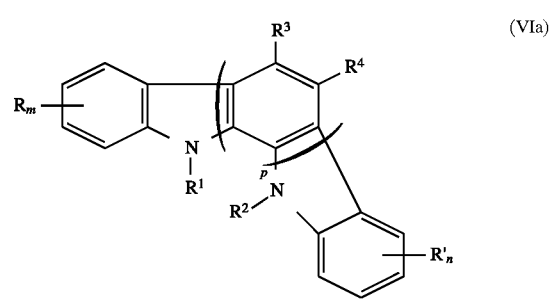

(VIa)

wherein R and R' are independently selected from the group consisting of a hydrogen atom, a halogen atom, alkyl, alkoxyl, and aryl; m and n are numbers of from 0 to 4; $R^1$ and $R^2$ are independently selected from the group consisting of alkyl, aryl, vinyl, and diarylaminoaryl; $R^3$ and $R^4$ are an atom of hydrogen, alkyl, alkoxy, aryl, or halogen, and p is a number of from 1 to 3.

29 Claims, No Drawings

INDOLOCARBAZOLE PHOTOCONDUCTORS

Illustrated in copending applications U.S. Ser. No. 942,598; U.S. Ser. No. 942,882; and U.S. Ser. No. 942,647, and filed currently herewith, the disclosures of each application being totally incorporated herein by reference, are El devices containing, for example, indolocarbazoles, amines thereof, and processes thereof.

Also, in U.S. Pat. No. 5,473,064, the disclosure of which is totally incorporated herein by reference, there is illustrated a process for the preparation of hydroxygallium phthalocyanine Type V, essentially free of chlorine.

Also, illustrated in copending applications and patents U.S. Pat. No. 5,763,110. U.S. Ser. No. 707,260, U.S. Ser. No. 807,488, U.S. Ser. No. 807,489, U.S. Ser. No. 807,510 and U.S. Ser. No. 829,398, the disclosures of each being totally incorporated herein by reference, are EL devices.

In U.S. Pat. No. 5,645,965, the disclosure of which is totally incorporated herein by reference, there are illustrated photoconductive imaging members with perylenes.

The appropriate components, such as the substrates, photogenerating components, resin binders, adhesive layers, silane layers, protective overcoatings, and the like, of the aforementioned patents and patent applications, and the prior art references cited therein, can be selected as components for the imaging members of the present application in embodiments thereof.

BACKGROUND OF THE INVENTION

This invention is generally directed to indolocarbazole compounds, photoconductive imaging members thereof, organic charge, especially hole transports, and also in embodiments organic hole transport molecules that are suitable for layered electroluminescent (EL) devices. In embodiments, the present invention is directed to organic hole transport molecules which enable the design and fabrication of thermally and morphologically stable hole transport components, and which components possess enhanced operational stability, and thus long operational life. More specifically, the present invention in embodiments relates to indolocarbazole hole transport compounds and processes thereof, and which indolocarbazole compounds can be selected for the preparation of thermally and morphologically stable thin film hole transport layers for photoconductive imaging members. The photoconductive imaging members can be comprised of the indolocarbazole compounds as charge transport components, and more specifically, wherein the imaging members are comprised of a supporting substrate, such as a metal, or a metallized polymer like aluminized MYLAR®, a photogenerating layer of, for example, hydroxygallium phthalocyanines, titanyl phthalocyanines, perylenes, especially BZP, chlorindinium phthalocyanines, selenium, especially trigonal selenium, and the like. Examples of supporting substrates, photogenerating components, and other components for the imaging member are illustrated in a number of U.S. Pat. Nos., such as 4,265,990 and 5,645,965, the disclosures of which are totally incorporated herein by reference.

The imaging members of the present invention in embodiments exhibit excellent cyclic stability, independent layer discharge, and substantially no adverse changes in performance over extended time periods. The aforementioned photoresponsive, or photoconductive imaging members can be negatively charged when the photogenerating layer is situated between the hole transport layer and the substrate. Processes of imaging, especially xerographic imaging and printing, including digital, are also encompassed by the present invention.

More specifically, the layered photoconductive imaging members can be selected for a number of different known imaging and printing processes including, for example, electrophotographic imaging processes, especially xerographic imaging and printing processes wherein negatively charged or positively charged images are rendered visible with toner compositions of an appropriate charge polarity. The imaging members as indicated herein are in embodiments sensitive in the wavelength region of, for example, from about 550 to about 900 nanometers, and in particular, from about 700 to about 850 nanometers, thus diode lasers can be selected as the light source. Moreover, the imaging members of the present invention are preferably useful in color xerographic applications where several color printings can be achieved in a single pass.

PRIOR ART

Layered photoresponsive imaging members have been described in a number of U.S. patents, such as U.S. Pat. No. 4,265,990, the disclosure of which is totally incorporated herein by reference, wherein there is illustrated an imaging member comprised of a photogenerating layer, and an aryl amine hole transport layer. Examples of photogenerating layer components include trigonal selenium, metal phthalocyanines, vanadyl phthalocyanines, and metal free phthalocyanines. Additionally, there is described in U.S. Pat. No. 3,121,006 a composite xerographic photoconductive member comprised of finely divided particles of a photoconductive inorganic compound dispersed in an electrically insulating organic resin binder. The binder materials disclosed in the '006 patent comprise a material which is incapable of transporting for any significant distance injected charge carriers generated by the photoconductive particles.

Also, in U.S. Pat. No. 4,555,463, the disclosure of which is totally incorporated herein by reference, there is illustrated a layered imaging member with a chloroindium phthalocyanine photogenerating layer. In U.S. Pat. No. 4,587,189, the disclosure of which is totally incorporated herein by reference, there is illustrated a layered imaging member with, for example, a BZP perylene, pigment photogenerating component. Both of the aforementioned patents disclose an aryl amine component as a hole transport layer.

Illustrated in U.S. Pat. No. 5,493,016, the disclosure of which is totally incorporated herein by reference, are imaging members comprised of a supporting substrate, a photogenerating layer of hydroxygallium phthalocyanine, a charge transport layer, a photogenerating layer of BZP perylene, which is preferably a mixture of bisbenzimidazo (2,1-a-1',2'-b) anthra(2,1,9-def:6,5,10-d'e'f')diisoquinoline-6,11-dione and bisbenzimidazo (2,1-a:2',1'-a)anthra(2,1,9-def:6,5,10-d'e'f')diisoquinoline-10, 21-dione, reference U.S. Pat. No. 4,587,189, the disclosure of which is totally incorporated herein by reference; and as a top layer a second charge transport layer U.S. Pat. No. 4,587,189, the disclosure of which is totally incorporated herein by reference, illustrates photoconductive imaging members with certain perylenes; and U.S. Pat. No. 5,482,811, the disclosure of which is totally incorporated herein by reference, illustrated photoconductive imaging members with Type V hydroxygallium phthalocyanine.

The disclosures of all of the aforementioned copending applications and patents are totally incorporated herein by reference.

SUMMARY OF THE INVENTION

It is a feature of the present invention to provide imaging members thereof with many of the advantages illustrated herein.

Another feature of the present invention relates to the provision of improved layered photoresponsive imaging members with photosensitivity to near infrared radiations.

It is yet another feature of the present invention to provide improved layered photoresponsive imaging members with a sensitivity to visible light, and which members possess improved electricals and improved coating characteristics, and wherein the charge transport molecules do not diffuse, or there is minimum diffusion thereof into the photogenerating layer.

Moreover, another feature of the present invention relates to the provision of improved layered photoresponsive imaging members with photosensitivity to near infrared radiations, for example from about 750 to about 950 nanometers, and to visible light of a wavelength of from about 500 to about 800 nanometers.

In embodiments, the present invention relates to the provision of imaging members, and more specifically, the photoconductive imaging members are comprised of an optional supporting substrate, a photogenerating layer of, for example, hydroxygallium phthalocyanine, BZP perylene, and the like, reference U.S. Pat. No. 4,587,189, and an indolocarbazole charge transport layer.

In embodiments, the present invention relates to a photoconductive imaging member comprised of a charge transport layer comprised of an indolocarbazole represented by the Formulas (Ia), (IIa), (IIIa), (IVa), (Va), or (VIa); or optionally mixtures thereof:

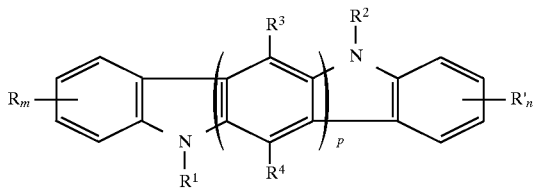
(Ia)

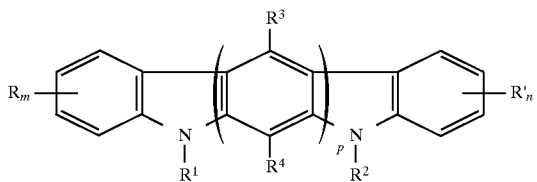
(IIa)

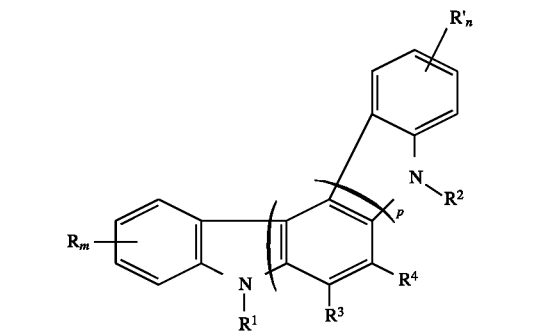
(IIIa)

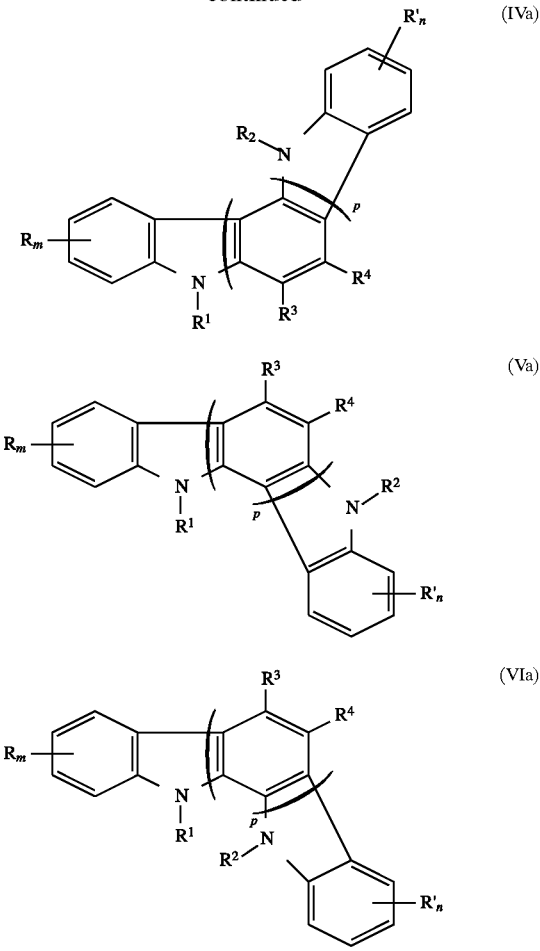

wherein R and R' are independently selected from the group consisting of a hydrogen atom, a halogen atom, alkyl, alkoxyl, and aryl; m and n are numbers of from 0 to 4; $R^1$ and $R^2$ are independently selected from the group consisting of alkyl, aryl, vinyl, and diarylaminoaryl; $R^3$ and $R^4$ are an atom of hydrogen, alkyl, alkoxy, aryl, or halogen, and p is a number of from 1 to 3; a member wherein aryl is a fused aromatic ring; a member wherein said fused ring is benzo; a member wherein alkyl contains from 1 to about 25 carbon atoms, alkoxy contains from 1 to about 25 carbon atoms, and aryl contains from 6 to about 30 carbon atoms; a member wherein alkyl contains from 1 to about 10 carbon atoms, alkoxy contains from 2 to about 12 carbon atoms, and aryl contains from 6 to about 18 carbon atoms; a member wherein alkyl contains from 1 to about 6 carbon atoms, and alkoxy contains from 1 to about 6 carbon atoms; a member wherein alkyl is methyl, ethyl, propyl, butyl, pentyl, heptyl, or hexyl, and wherein alkoxy is methoxy, ethoxy, propoxy, butoxy, pentoxy, or heptoxy; a member wherein halogen is a chlorine, bromine, fluorine, or iodine atom; a member wherein aryl is phenyl; a member wherein m and n are the numbers 1, 2, 3, or 4; a member wherein R and R' are hydrogen atoms, or alkyl, and $R^1$ and $R^2$ are aryl; a member wherein $R^3$ and $R^4$ are hydrogen atoms; a member wherein $R^1$ and $R^2$ are independently selected from the group consisting of phenyl, naphthyl, and biphenyl; a member wherein $R^1$ or $R^2$ are diarylaminoaryl as represented by Formula (VII):

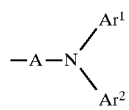 (VII)

wherein A is arylene, and Ar¹ and Ar² are aryl; a member wherein A is selected from the group consisting of phenylene and biphenylene, and Ar¹ and Ar² are aryl groups independently selected from the group consisting of phenyl, tolyl, xylyl, chlorophenyl, alkoxyphenyl, and naphthyl; a member wherein indolocarbazole (Ia), or (IIa) is selected; a member wherein said indolocarbazole is 5,11-di-m-tolyl-5, 11-dihydroindolo[3,2-b]carbazole, 5,11-bis(3,4-dimethylphenyl)-5,11-dihydroindolo[3,2-b]carbazole, 5,11-di-1-naphthyl-5,11-dihydroindolo[3,2-b]carbazole, 5,11-bis (3-methoxyphenyl) -5,11-dihydroindolo[3,2-b]carbazole, or 5,11-bis[4'-(3-methyldiphenylamino)-1,1'-biphenyl-4-yl]-5, 11-dihydroindolo[3,2-b]carbazole; a member comprised of a supporting substrate, a photogenerating layer, and a charge transport layer, and wherein said charge transport layer is comprised of said indolocarbazoles; a member wherein said photogenerating layer is comprised of photogenerating components of selenium, metal free phthalocyanines, metal phthalocyanines, hydroxygallium phthalocyanines, perylenes, or titanyl phthalocyanines; a member wherein said photogenerating layer is situated between the substrate and the charge transport layer, and said charge transport layer components are dispersed in a resin binder; a process for the preparation of indolocarbazoles represented by Formulas (Ia) through (VIa), which comprises the condensation of a dihydroindolocarbazole (Ib), (IIb), (IIIb), (IVb), (Vb), or (VIb), with an aryl halide in the presence of a copper catalyst:

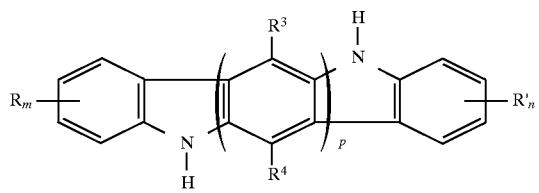 (Ib)

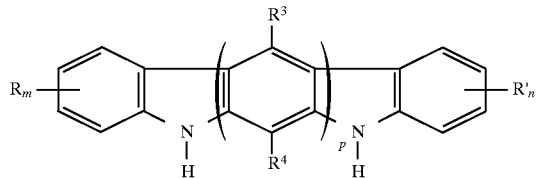 (IIb)

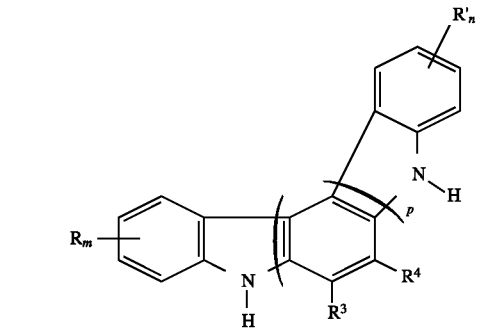 (IIIb)

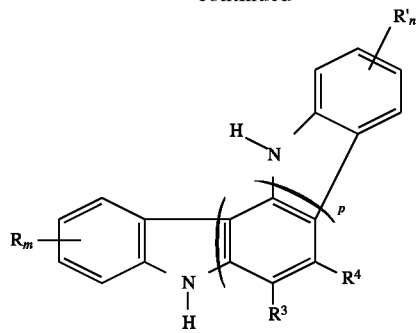 (IVb)

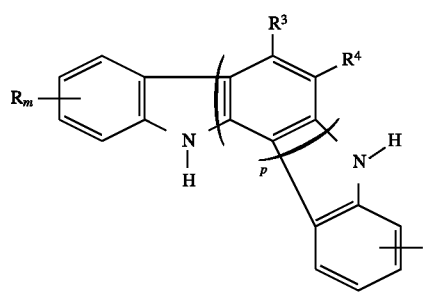 (Vb)

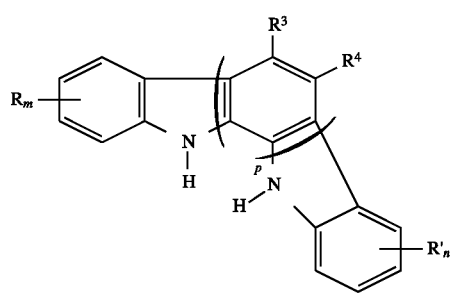 (VIb)

wherein R and R' are independently selected from the group consisting of hydrogen, halogen, alkyl, alkoxyl, diarylaminoaryl, and aryl; m and n are numbers of from 0 to 4; R³ and R⁴ are hydrogen, alkyl, alkoxy, aryl, or halogen, and p is a number of from 1 to 3; a process wherein said condensation is conducted by heating at a reaction temperature of from about 120° C. to about 250° C., and said dihydroindolocarbazole is selected from the group consisting of 5,11-dihydroindolo[3,2-b]carbazole, 5,7-dihydroindolo[2,3-b]carbazole, 5,12-dihydroindolo[3,2-c] carbazole, 5,10-dihydroindolo[3,2-a]carbazole, and 11,12-dihydroindolo[2,3-a]carbazole, said aryl halide is an aryl iodide, said copper catalyst is selected from the group consisting of copper powder, copper (I) oxide, copper (I) chloride, copper (II) sulfate, copper (II) acetate, and a copper compound salt, and a ligand selected from the group consisting of monodentate tertiary amines and bidentate tertiary amines; a member wherein said indolocarbazole is 5,11-di-m-tolyl-5,11-dihydroindolo[3,2-b]carbazole, 5,11-bis(3,4-dimethylphenyl)-5,11-dihydroindolo[3,2-b]carbazole, 5,11-di-1-naphthyl-5,11-dihydroindolo[3,2-b]carbazole, 5,11-diphenyl-5,11-dihydroindolo[3,2-b]carbazole, 5,11-bis-(1, 1-biphenyl-4-yl)-5,11-dihydroindolo[3,2-b]carbazole, 5,11-bis(3-methoxyphenyl)-5,11-dihydroindolo[3,2-b]carbazole, 5,11-bis(4-chlorophenyl)-5,11-dihydroindolo[3,2-b] carbazole, 5,11-bis[4'-(3-methyldiphenylamino)-1,1'-biphenyl-4-yl]-5,11-dihydroindolo[3,2-b]carbazole, 5,11-bis[4'-(4-methyldiphenylamino)-1,1'-biphenyl-4-yl]-5,11-dihydroindolo[3,2-b]carbazole, 5,11-bis[4'-(diphenylamino) -1,1'-biphenyl-4-yl]-5,11-dihydroindolo[3,2-b]carbazole, 5,11-bis[4'-(diphenylamino)-1,1'-biphenyl-4-yl]-5,11-dihydroindolo[3,2-b]carbazole, 5,11-bis[4'-(di-p-tolylamino)-1,1'-biphenyl-4-yl]-5,11-dihydroindolo[3,2-b]carbazole, 5,11-bis[4'-(3,4-dimethyldiphenylamino)-1,1'-biphenyl-4-yl]-5,11-dihydroindolo[3,2-b]carbazole, 5,11-bis[4'-(3-methoxydiphenylamino)-1,1'-biphenyl-4-yl]-5,11-dihydroindolo[3,2-b]carbazole, 5,11-bis[4'-(3-chlorodiphenylamino)-1,1'-biphenyl-4-yl]-5,11-dihydroindolo[3,2-b]carbazole, 5,11-bis[4'-(4-chlorodiphenylamino)-1,1'-biphenyl-4-yl]-5,11-dihydroindolo[3,2-b]carbazole, 5,11-bis[4'-(diphenylamino)-1,1'-biphenyl-4-yl]-2,8-dimethyl-5,11-dihydroindolo[3,2-b]carbazole, 5,11-bis[4'-(4-methyldiphenylamino)-1,1'-biphenyl-4-yl]-2,8-dimethyl-5,11-dihydroindolo[3,2-b]carbazole, 5,11-bis[4-(diphenylamino)phenyl]-5,11-dihydroindolo[3,2-b]carbazole, 5,11-bis[4-(3-methyldiphenylamino)phenyl]-5,11-dihydroindolo[3,2-b]carbazole, 5,11-bis[4-(4-methyldiphenylamino)phenyl]-5,11-dihydroindolo[3,2-b]carbazole, 5,11-bis[4-(diphenylamino)phenyl]-2,8-dimethyl-5,11-dihydroindolo[3,2-b]carbazole, 5,11-bis[4-(4-methyldiphenylamino)phenyl]-2,8-dimethyl-5,11-dihydroindolo[3,2-b]carbazole, 5,11-bis[4-(1-naphthylphenylamino)phenyl]-5,11-dihydroindolo[3,2-b]carbazole, 5,7-di-m-tolyl-5,7-dihydroindolo[2,3-b]carbazole, 5,7-bis(3,4-dimethylphenyl)-5,7-dihydroindolo[2,3-b]carbazole, 5,7-di-1-naphthyl-5,7-dihydroindolo[2,3-b]carbazole, 5,7-diphenyl-5,7-dihydroindolo[2,3-b]carbazole, 5,7-bis-(1,1-biphenyl-4-yl)-5,7-dihydroindolo [2,3-b]carbazole, 5,7-bis(3-methoxyphenyl)-5,7-dihydroindolo[2,3-b]carbazole, 5,7-bis[4'-(3-methyldiphenylamino)-1,1'-biphenyl-4-yl]-5,7-dihydroindolo[2,3-b]carbazole, 5,7-bis[4'-(diphenylamino)-1,1'-biphenyl-4-yl]-5,7-dihydroindolo[2,3-b]carbazole, 5,7-bis[4'-(di-p-tolylamino)-1-1'-biphenyl -4-yl]-5,7-dihydroindolo[2,3-b]carbazole, 5,7-bis[4'-(diphenylamino)-1,1'-biphenyl-4-yl]-2,10-dimethyl-5,7-dihydroindolo[2,3-b]carbazole, 5,7-bis[4-(diphenylamino)phenyl]-5,7-dihydroindolo[2,3-b]carbazole, 5,7-bis[4-(3-methyldiphenylamino)phenyl]-5,7-dihydroindolo[2,3-b]carbazole, 5,8-diphenyl-5,8-dihydroindolo[2,3-c]carbazole, 5,8-di-m-tolyl-5,8-dihydroindolo[2,3-c]carbazole, 5,8-bis-(1,1-biphenyl-4-yl)-5,8-dihydroindolo[2,3-c]carbazole, 5,8-di-1-naphthyl-5,8-dihydroindolo[2,3-c]carbazole, 5,8-bis-[4-(3-methyldiphenylamino)phenyl]-5,8-dihydroindolo[2,3-c]carbazole, 5,8-bis[4'-(3-methyldiphenylamino)-1,1'-biphenyl-4-yl]-5,8-dihydroindolo[2,3-c]carbazole, 5,10-diphenyl-5,10-dihydroindolo[3,2-a]carbazole, 5,10-di-m-tolyl-5,10-dihydroindolo[3,2-a]carbazole, 5,10-bis-(1,1-biphenyl-4-yl)-5,10-dihydroindolo[3,2-a]carbazole, 5,10-di-1-naphthyl-5,10-dihydroindolo[3,2-a]carbazole, 5,10-bis-[4-(3-methyldiphenylamino)phenyl]-5,10-dihydroindolo[3,2-a]carbazole, 5,12-diphenyl-5,12-dihydroindolo[3,2-c]carbazole, 5,12-di-m-tolyl-5,12-dihydroindolo[3,2-c]carbazole, 5,12-bis-(1,1-biphenyl-4-yl)-5,12-dihydroindolo[3,2-c]carbazole, 5,12-di-1-naphthyl-5,12-dihydroindolo[3,2-c]carbazole, 5,12-bis-[4-(3-methyldiphenylamino)phenyl]-5,12-dihydroindolo[3,2-c]carbazole, 5,12-bis[4'-(3-methyldiphenylamino)-1,1'-biphenyl-4-yl]-5,12-dihydroindolo[3,2-c]carbazole, 11,12-diphenyl-11,12-dihydroindolo[2,3-a]carbazole, or 11,12-di-p-tolyl-11,12-dihydroindolo[2,3-a]carbazole; and an imaging member wherein the supporting substrate is comprised of a conductive substrate, or a polymer, the photogenerator layer has a thickness of from about 0.05 to about 10 microns, the indolocarbazole transport layer has a thickness of from about 5 to about 30 microns, and wherein the photogenerating layer components are optionally dispersed in a resinous binder in an amount of from about 5 percent by weight to about 95 percent by weight; a photoconductive imaging member comprised of a supporting substrate, a photogenerating layer, and a charge transport layer, and wherein said charge transport layer is comprised of an indolocarbazole represented by the Formulas (Ia), (IIa), (IIIa), (IVa), (Va), or (VIa):

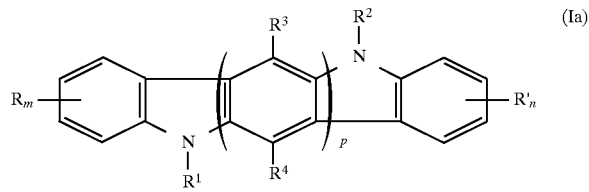

(Ia)

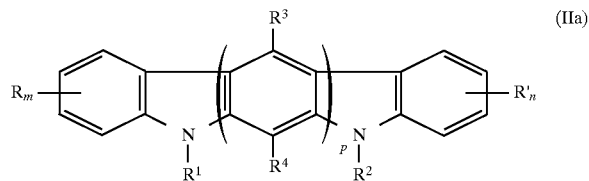

(IIa)

-continued

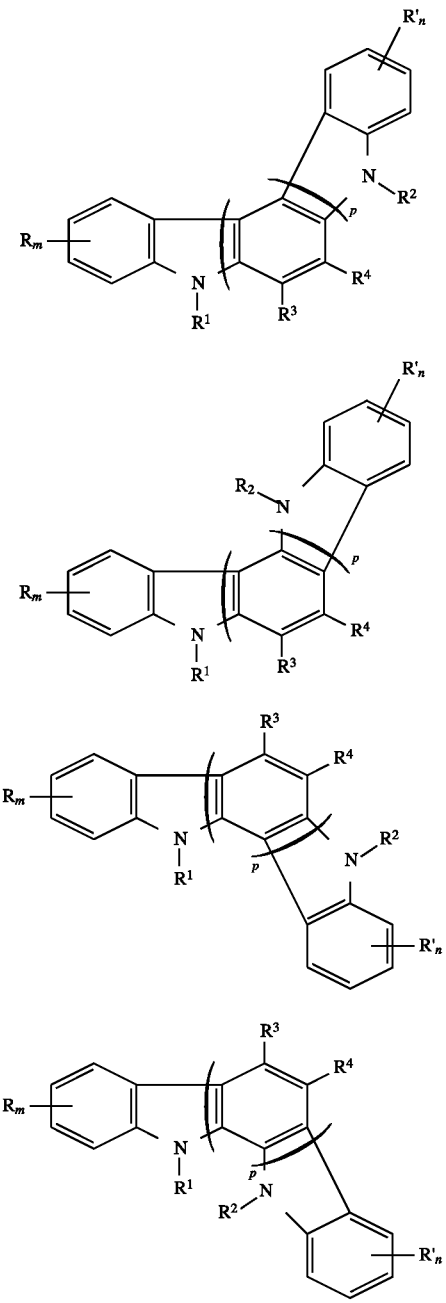

wherein R and R' are independently selected from the group consisting of a hydrogen atom, a halogen atom, alkyl, alkoxyl, and aryl; m and n are numbers; $R^1$ and $R^2$ are independently selected from the group consisting of alkyl, aryl, and diarylaminoaryl; $R^3$ and $R^4$ are an atom of hydrogen, alkyl, alkoxy, aryl, or halogen, and p is a number.

Embodiments of the present invention include a method of imaging which comprises generating an electrostatic latent image on the imaging member comprised in the following order of a supporting substrate, a photogenerator layer, and an indolocarbazole of the formulas illustrated herein; developing the latent image; and transferring the developed electrostatic image to a suitable substrate; and wherein the imaging member is exposed to light of a wavelength of from about 400 to about 800 nanometers.

The imaging members of the present invention can in embodiments be prepared by a number of known methods, the process parameters and the order of coating of the layers being dependent, for example, on the member desired. The photogenerating and charge transport layers of the imaging members can be coated as solutions or dispersions onto a selective substrate by the use of a spray coater, dip coater, extrusion coater, roller coater, wire-bar coater, slot coater, doctor blade coater, gravure coater, and the like; and dried at from 40° to about 200° C. for from 10 minutes to several hours under stationary conditions or in an air flow. The coating can be accomplished to provide a final coating thickness of from about 0.01 to about 30 microns after drying. The fabrication conditions for a given photoconductive layer can be tailored to achieve optimum performance and cost in the final members.

Examples of substrate layers selected for the imaging members of the present invention can be opaque or substantially transparent, and may comprise any suitable material having the requisite mechanical properties. Thus, the substrate may comprise a layer of insulating material including inorganic or organic polymeric materials, such as MYLAR® a commercially available polymer, MYLAR® containing titanium, a layer of an organic or inorganic material having a semiconductive surface layer, such as indium tin oxide, or aluminum arranged thereon, or a conductive material inclusive of aluminum, chromium, nickel, brass or the like. The substrate may be flexible, seamless, or rigid, and many have a number of many different configurations, such as for example a plate, a cylindrical drum, a scroll, an endless flexible belt, and the like. In one embodiment, the substrate is in the form of a seamless flexible belt. In some situations, it may be desirable to coat on the back of the substrate, particularly when the substrate is a flexible organic polymeric material, an anticurl layer, such as for example polycarbonate materials commercially available as MAKROLON®.

The thickness of the substrate layer depends on many factors, including economical considerations, thus this layer may be of substantial thickness, for example over 3,000 microns, or of minimum thickness providing there are no adverse effects on the system. In embodiments, the thickness of this layer is from about 75 microns to about 300 microns.

Generally, the thickness of the photogenerator layers depends on a number of factors, including the thicknesses of the other layers and the amount of photogenerator material contained in these layers. Accordingly, this layer can be of a thickness of, for example, from about 0.05 micron to about 15 microns, and more specifically, from about 0.25 micron to about 1 micron when, for example, each of the photogenerator compositions, or pigments is present in an amount of from about 30 to about 75 percent by volume. The maximum thickness of the layers in an embodiment is dependent primarily upon factors, such as photosensitivity, electrical properties and mechanical considerations. The photogenerating layer binder resin, optionally present in various suitable amounts, for example from about 1 to about 20, and more specifically, from about 1 to about 10 weight percent, may be selected from a number of known polymers, such as poly(vinyl butyral), poly(vinyl carbazole), polyesters, polycarbonates, poly(vinyl chloride), polyacrylates and methacrylates, copolymers of vinyl chloride and vinyl acetate, phenoxy resins, polyurethanes, poly(vinyl alcohol), polyacrylonitrile, polystyrene, and the like. In embodiments of the present invention, it is desirable to select a coating solvent that does not disturb or adversely effect the other previously coated layers of the device. Examples of solvents that can be selected for use as coating solvents for the photogenerator layers are ketones, alcohols, aromatic hydrocarbons, halogenated aliphatic hydrocarbons, ethers, amines, amides, esters, and the like. Specific examples are cyclohexanone, acetone, methyl ethyl ketone, methanol, ethanol, butanol, amyl alcohol, toluene, xylene, chlorobenzene, carbon tetrachloride, chloroform, methylene chloride, trichloroethylene, tetrahydrofuran, dioxane, diethyl ether, dimethyl formamide, dimethyl acetamide, butyl acetate, ethyl acetate, methoxyethyl acetate, and the like.

The coating of the photogenerator layers in embodiments of the present invention can be accomplished with spray, dip or wire-bar methods such that the final dry thickness of the photogenerator layer is, for example, from about 0.01 to about 30 microns and preferably from about 0.1 to about 15 microns after being dried at, for example, about 40° C. to about 150° C. for about 5 to about 90 minutes.

Illustrative examples of polymeric binder materials that can be selected for the photogenerator pigments are as indicated herein, and include those polymers as disclosed in U.S. Pat. No. 3,121,006, the disclosure of which is totally incorporated herein by reference.

As optional adhesives usually in contact with the supporting substrate, there can be selected various known substances inclusive of polyesters, polyamides, poly(vinyl butyral), poly(vinyl alcohol), polyurethane and polyacrylonitrile. This layer is of a thickness of, for example, from about 0.001 micron to about 1 micron. Optionally, this layer may contain effective suitable amounts, for example from about 1 to about 10 weight percent, conductive and non-conductive particles, such as zinc oxide, titanium dioxide, silicon nitride, carbon black, and the like, to provide, for example, in embodiments of the present invention further desirable electrical and optical properties.

Examples of the highly insulating and transparent polymer binder material for the transport layer include components, such as those described in U.S. Pat. No. 3,121,006, the disclosure of which is totally incorporated herein by reference. Specific examples of polymer binder materials include polycarbonates, acrylate polymers, vinyl polymers, cellulose polymers, polyesters, polysiloxanes, polyamides, polyurethanes and epoxies as well as block, random or alternating copolymers thereof. Preferred electrically inactive binders are comprised of polycarbonate resins having a molecular weight of from about 20,000 to about 100,000 with a molecular weight of from about 50,000 to about 100,000 being particularly preferred. Generally, the transport layer contains from about 10 to about 75 percent by weight of the charge transport material, and preferably from about 35 percent to about 50 percent of this material.

Also, included within the scope of the present invention are methods of imaging and printing with the photoresponsive devices illustrated herein. These methods generally involve the formation of an electrostatic latent image on the imaging member, followed by developing the image with a toner composition comprised, for example, of thermoplastic resin, colorant, such as pigment, charge additive, and surface additives, reference U.S. Pat. Nos. 4,560,635; 4,298,697 and 4,338,390, the disclosures of which are totally incorporated herein by reference, subsequently transferring the image to a suitable substrate, and permanently affixing the image thereto. In those environments wherein the device is to be used in a printing mode, the imaging method involves the same steps with the exception that the exposure step can be accomplished with a laser device or image bar.

The indolocarbazole compounds selected for the charge transport layer are as illustrated by, for example, Formulas (Ia) through (VIa); or optionally, mixtures thereof

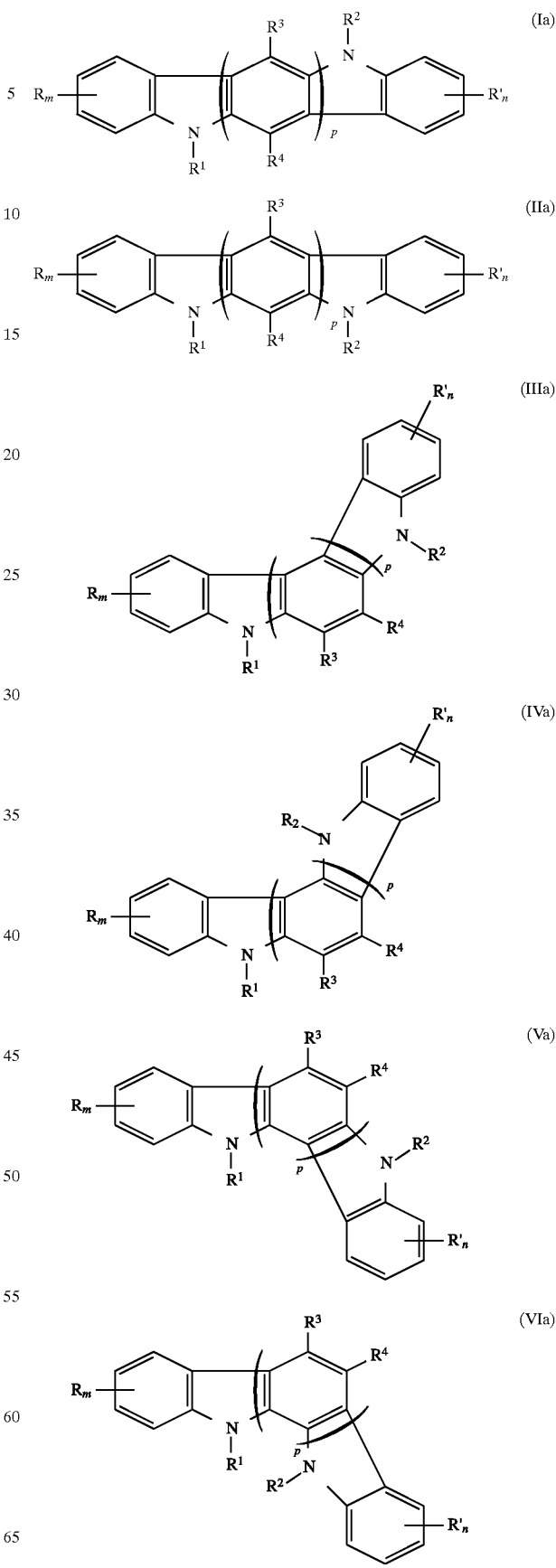

wherein R and R' are independently selected from the group consisting of hydrogen atoms, halogen atoms, such as chlorine, bromine, fluorine, or iodine, alkyl groups with, for example, 1 to about 25 carbon atoms, alkoxy groups with, for example, from 1 to about 25 carbon atoms, aryl groups with, for example, from 6 to about 30 carbon atoms, fused aromatic rings, such as benzo, and the like; m and n are preferably numbers of from 0 to 4; $R^1$ and $R^2$ are independently alkyl, aryl, vinyl, diarylaminoaryl groups, and the like; $R^3$ and $R^4$ are independently hydrogen atom, alkyl, alkoxy, aryl groups, and halogen atom; and p is preferably a number of from 1 to 3. Specific examples of alkyl groups are methyl, ethyl, propyl, butyl, pentyl, hexyl, octyl, nonyl, cyclohexyl, cyclopentyl, and the like; illustrative examples of specific aryl groups, $R^1$ and $R^2$ include phenyl, tolyl, halophenyl, such as chlorophenyl, alkoxyphenyl, such as methoxyphenyl, naphthyl, biphenylyl, terphenyl, and the like; and specific examples of alkoxy groups include methoxy, ethoxy, propoxy, butoxy, pentoxy, and the like. Other known alkyl, alkoxy, and aryl can be selected in embodiments of the present invention.

Specifically, the photoconductive imaging member of the present invention is comprised of an indolocarbazole represented by the alternative Formulas (Ia) through (VIa), wherein R and R' are independently selected from the group consisting of a hydrogen atom, a halogen atom, alkyl, alkoxy, and aryl; m and n are numbers of 0 to 4; $R^1$ and $R^2$ are independently selected from the group consisting of alkyl, aryl, and diarylaminoaryl groups; $R^3$ and $R^4$ are hydrogen atom, alkyl, alkoxy, aryl, or halogen atom, and p is a number of from 1 to 3. The indolocarbazole compounds possess a number of advantages as illustrated herein, inclusive of for example that they display excellent hole transporting capability, superior thermal stability, and they can also be vacuum deposited as thin film hole transport components. The indolocarbazoles when selected as hole transport components, greatly improve the operational performance and life span of the imaging member.

Specific examples of aryl groups selected for $R^1$ and $R^2$ are as indicated herein, and include, for example, phenyl, biphenylyl, naphthyl, thienyl and the like, and their substituted derivatives with substituents, such as alkyl, alkoxy, aryl, and halogen atoms. Aminoaryl groups can also be selected for $R^1$ and $R^2$ and these groups can be represented by Formula (VII).

wherein A is an arylene; $Ar^1$, $Ar^2$ are aryl groups with from about 6 to about 30 carbon atoms independently selected from, for example, the group consisting of phenyl, tolyl, xylyl, halophenyl, such as chlorophenyl, alkoxyphenyl, naphthyl and the like. Illustrative examples of arylene groups include those with from about 7 to about 25 carbon atoms, such as 1,4-phenylene, 1,3-phenylene, 4,4'-biphenylene, 3,4'-biphenylene, 1,4-naphthylene, 2,6-naphthylene, 1,5-naphthylene, 4,4'-terphenylene, and substituted derivatives thereof with substituents of, for example, alkyl with 1 to about 5 carbon atoms, phenyl, and aryl with substituents of halogen atom, alkyl and alkoxy with 1 to about 12 carbons, and the like. Illustrative arylenes are represented by the following formulas:

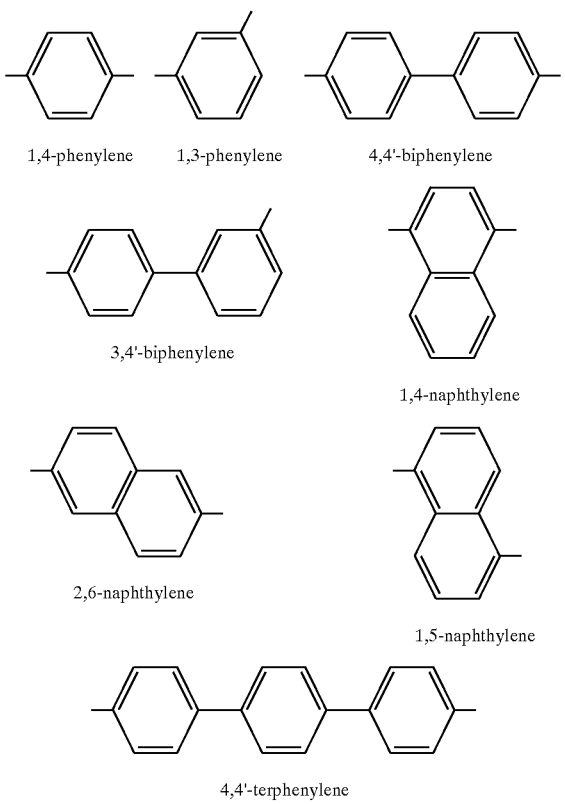

The indolocarbazole hole transport compounds (Ia) through (VIa), wherein $R^1$ and $R^2$ are aryl groups, can be prepared by Ullmann condensation of the corresponding dihydroindolocarbazole precursors selected from those represented by Formulas (Ib) through (VIb) with aryl halide in the presence of a copper catalyst, especially a ligand copper catalyst as illustrated in U.S. Pat. Nos. 5,723,669; 5,705,697; 5,723,671; and U.S. Pat. Nos. 5,538,829; 5,648,542; 5,654,482 and 5,648,539, the disclosures of each being totally incorporated herein by reference. Specific examples of dihydroindolocarbazoles, which can be readily obtained by known literature processes, are, for example, 5,11-dihydroindolo[3,2-b]carbazole, 5,7-dihydroindolo[2,3-b]carbazole, 5,12-dihydroindolo[3,2-c]carbazole, 5,10-dihydroindolo[3,2-a]carbazole, 11,12-dihydroindolo[2,3-a]carbazole, and the like.

Illustrative examples of aryl halides that can be utilized for the Ullmann condensation are iodobenzene, 3-iodotoluene, 4-iodotoluene, 4-iodo-1,2-xylene, 1-iodonaphthalene, 2-iodonaphthalene, 4-iodobiphenyl, 4-iodo-4'-(3-methyldiphenylamino)-1,1'-biphenyl, 4-iodo-4'-(diphenylamino)-1,1'-biphenyl, N,N-diphenyl-4-iodoaniline, N-phenyl-N-3-tolyl-4-iodoaniline, and the like. The Ullmann condensation is generally accomplished in an inert solvent, such as dodecane, tridecance, xylene, sulfolane, high boiling petroleum ethers with boiling point of, for example, over about 150° C., and the like, at a reaction temperature ranging from 90° C. to about 300° C., and preferably from 150° C. to 250° C. Any copper catalysts suitable for Ullmann condensation, including copper powder, copper (I) oxide, copper (I) chloride, copper (II) sulfate, copper (II) acetate, and the like, may be employed for the process of the present invention. An effective molar ratio of the copper catalyst to the dihydroindolocarbazole compound ranges from about 0.01 to about 0.5. The condensation reaction can be greatly accelerated with a base, such as for example an alkaline metal hydroxide or carbonate including potassium hydroxide, potassium carbonate, sodium hydroxide, and the like. After the condensation, the reaction mixture is cooled down to about room temperature, and the product is isolated by known separation techniques such as, for example, by filtration and chromatography. The product is generally characterized by known analytical techniques such as IR and NMR.

The indolocarbazole hole transport molecules may be utilized in many forms in various applications. For example, they can be used as thin films formed of one or more of thin films formed of one or more of the indolocarbazole compounds, or mixtures with other known hole transport materials, such as those based on triarylamines, reference for example U.S. Pat. No. 4,265,990. The films may be formed by many fabrication techniques, such as for example vacuum deposition, spin coating, or molecular beam epitaxy technique. In another application, as active hole transport components in a transport medium, the indolocarbazole hole transport compounds can be dispersed in a polymer matrix, or in a sol gel matrix. Any conventional polymers, such as polycarbonates, polyesters, or polyhydrocarbons, and inorganic polymers, may be employed as the matrix binders for these applications.

Illustrative examples of specific indolocarbazole compounds as represented by Formulas (Ia) through (VIa), which can be selected for use in the photoconductive imaging members of the present invention, with the preferred ones being (1), (2), (3), (4), (7), (8), (11), (13), (19), (24), (25), (30), (36), (41), (43), (46), (48), (49), and 51, are:

(1) 5,11-di-m-tolyl-5,11-dihydroindolo[3,2-b]carbazole,
(2) 5,11-bis(3,4-dimethylphenyl)-5,11-dihydroindolo[3,2-b]carbazole,
(3) 5,11-di-1-naphthyl-5,11-dihydroindolo[3,2-b]carbazole,
(4) 5,11-bis[4'-(3-methyldiphenylamino)-1,1'-biphenyl-4-yl]-5,11-dihydroindolo[3,2-b]carbazole,
(5) 5,11-diphenyl-5,11-dihydroindolo[3,2-b]carbazole,
(6) 5,11-bis-(1,1-biphenyl-4-yl)-5,11-dihydroindolo[3,2-b]carbazole,
(7) 5,11-bis(3-methoxyphenyl)-5,11-dihydroindolo[3,2-b]carbazole,
(8) 5,11-bis(4-chlorophenyl)-5,11-dihydroindolo[3,2-b]carbazole,
(9) 5,11-bis[4'-(4-methyldiphenylamino)-1,1'-biphenyl-4-yl]-5,11-dihydroindolo[3,2-b]carbazole,
(10) 5,11-bis[4'-(diphenylamino)-1,1'-biphenyl-4-yl]-5,11-dihydroindolo[3,2-b]carbazole,
(11) 5,11-bis[4'-(di-p-tolylamino)-1,1'-biphenyl-4-yl]-5,11-dihydroindolo[3,2-b]carbazole,
(12) 5,11-bis[4'-(3,4-dimethyldiphenylamino)-1,1'-biphenyl-4-yl]-5,11-dihydroindolo[3,2-b]carbazole,
(13) 5,11-bis[4'-(3-methoxydiphenylamino)-1,1'-biphenyl-4-yl]-5,11-dihydroindolo[3,2-b]carbazole,
(14) 5,11-bis[4'-(3-chlorodiphenylamino)-1,1'-biphenyl-4-yl]-5,11-dihydroindolo[3,2-b]carbazole,
(15) 5,11-bis[4'-(4-chlorodiphenylamino)-1,1'-biphenyl-4-yl]-5,11-dihydroindolo[3,2-b]carbazole,
(16) 5,11-bis[4'-(diphenylamino)-1,1'-biphenyl-4-yl]-2,8-dimethyl-5,11-dihydroindolo[3,2-b]carbazole,
(17) 5,11-bis[4'-(4-methyldiphenylamino)-1,1'-biphenyl-4-yl]-2,8-dimethyl-5,11-dihydroindolo[3,2-b]carbazole,
(18) 5,11-bis[4-(diphenylamino)phenyl]-5,11-dihydroindolo[3,2-b]carbazole,
(19) 5,11-bis[4-(3-methyldiphenylamino)phenyl]-5,11-dihydroindolo[3,2-b]carbazole,
(20) 5,11-bis[4-(4-methyldiphenylamino)phenyl]-5,11-dihydroindolo[3,2-b]carbazole,
(21) 5,11-bis[4-(diphenylamino)phenyl]-2,8-dimethyl-5,11-dihydroindolo[3,2-b]carbazole,
(22) 5,11-bis[4-(4-methyldiphenylamino)phenyl]-2,8-dimethyl-5,11-dihydroindolo[3,2-b]carbazole,
(23) 5,11-bis[4-(1-naphthylphenylamino)phenyl]-5,11-dihydroindolo[3,2-b]carbazole,
(24) 5,7-di-m-tolyl-5,7-dihydroindolo[2,3-b]carbazole,
(25) 5,7-bis(3,4-dimethylphenyl)-5,7-dihydroindolo[2,3-b]carbazole,
(26) 5,7-di-1-naphthyl-5,7-dihydroindolo[2,3-b]carbazole,
(27) 5,7-diphenyl-5,7-dihydroindolo[2,3-b]carbazole,
(28) 5,7-bis-(1,1-biphenyl-4-yl)-5,7-dihydroindolo[2,3-b]carbazole,
(29) 5,7-bis(3-methoxyphenyl)-5,7-dihydroindolo[2,3-b]carbazole,
(30) 5,7-bis[4'-(3-methyldiphenylamino)-1,1'-biphenyl-4-yl]-5,7-dihydroindolo[2,3-b]carbazole,
(31) 5,7-bis[4'-(diphenylamino)-1,1'-biphenyl-4-yl]-5,7-dihydroindolo[2,3-b]carbazole,
(32) 5,7-bis[4'-(di-p-tolylamino)-1,1'-biphenyl-4-yl]-5,7-dihydroindolo[2,3-b]carbazole,
(33) 5,7-bis[4'-(diphenylamino)-1,1'-biphenyl-4-yl]-2,10-dimethyl-5,7-dihydroindolo[2,3-b]carbazole,
(34) 5,7-bis[4-(diphenylamino)phenyl]-5,7-dihydroindolo[2,3-b]carbazole,
(35) 5,7-bis[4-(3-methyldiphenylamino)phenyl]-5,7-dihydroindolo[2,3-b]carbazole,
(36) 5,8-diphenyl-5,8-dihydroindolo[2,3-c]carbazole,
(37) 5,8-di-m-tolyl-5,8-dihydroindolo[2,3-c]carbazole,
(38) 5,8-bis-(1,1-biphenyl-4-yl)-5,8-dihydroindolo[2,3-c]carbazole,
(39) 5,8-di-1-naphthyl-5,8-dihydroindolo[2,3-c]carbazole,
(40) 5,8-bis-[4-(3-methyldiphenylamino)phenyl]-5,8-dihydroindolo[2,3-c]carbazole,
(41) 5,8-bis[4'-(3-methyldiphenylamino)-1,1'-biphenyl-4-yl]-5,8-dihydroindolo[2,3-c]carbazole,
(42) 5,10-diphenyl-5,10-dihydroindolo[3,2-a]carbazole,
(43) 5,10-di-m-tolyl-5,10-dihydroindolo[3,2-a]carbazole,
(44) 5,10-bis-(1,1-biphenyl-4-yl)-5,10-dihydroindolo[3,2-a]carbazole,
(45) 5,10-di-1-naphthyl-5,10-dihydroindolo[3,2-a]carbazole,
(46) 5,10-bis-[4-(3-methyldiphenylamino)phenyl]-5,10-dihydroindolo[3,2-a]carbazole
(47) 5,12-diphenyl-5,12-dihydroindolo[3,2-c]carbazole,
(48) 5,12-di-m-tolyl-5,12-dihydroindolo[3,2-c]carbazole,
(49) 5,12-bis-(1,1-biphenyl-4-yl)-5,12-dihydroindolo[3,2-c]carbazole,
(50) 5,12-di-1-naphthyl-5,12-dihydroindolo[3,2-c]carbazole,
(51) 5,12-bis-[4-(3-methyldiphenylamino)phenyl]-5,12-dihydroindolo[3,2-c]carbazole,
(52) 5,12-bis[4'-(3-methyldiphenylamino)-1,1'-biphenyl-4-yl]-5,12-dihydroindolo[3,2-c]carbazole
(53) 11,12-diphenyl-11,12-dihydroindolo[2,3-a]carbazole,
(54) 11,12-di-m-tolyl-11,12-dihydroindolo[2,3-a]carbazole,
(55) 11,12-di-p-tolyl-11,12-dihydroindolo[2,3-a]carbazole, and the like.

The substituents, such as for example, R and R', can be positioned at various different appropriate locations on the aromatic components, like the benzene ring.

The following Examples are provided.

EXAMPLE I

Synthesis of 5,11-di-m-tolyl-5,11-dihydroindolo[3,2-b]carbazole (1)

Preparation of 5,11-dihydroindolo[3,2-b]carbazole: In a 1.5 liter flask equipped with a mechanical stirrer and a condenser were added glacial acetic acid (100 milliliters) and concentrated sulfuric acid (20 milliliters). Into this mixture, which was maintained at 10° C. with an ice bath, was added powdered cyclohexane-1,4-dione bisphenylhydrazone (22.0 grams) in small portions with stirring. After the aforementioned addition, the ice bath was removed and the mixture was allowed to warm to 23° C., and stirred for a further 10 minutes. Subsequently, the mixture was heated to about 65° C. (Centigrade throughout) until an exothermic reaction occurred. The reaction mixture was cooled with an ice bath, and within 5 minutes a light brown solid was formed. The reaction mixture was allowed to remain at room temperature, about 25° C., for about 18 hours, and filtered. The filtered cake was then washed with acetic acid, water, and then stirred in boiling methanol for 30 minutes before filtering and drying in vacuo for about 2 to 5 hours to provide 7.2 grams of pure 5,11-dihydroindolo[3,2-b]carbazole as pale yellow crystals.

Preparation of 5,11-di-m-tolyl-5,11-dihydroindolo[3,2-b] carbazole

A 200-milliliter 3-necked round bottom flask equipped with a mechanical stirrer, reflux condenser, and argon inlet was purged with argon and then charged with 5,11-dihydroindolo[3,2-b]carbazole (5.1 grams, 0.02 mol), 3-iodotoluene (8.69 grams, 0.04 mol), copper sulfate pentahydrate (0.25 gram, 1.0 mmol), potassium carbonate (5.52 grams, 0.04 mol), and n-tridecane (5.0 milliliters). Under an argon atmosphere, the reaction mixture was heated to about 250° C. with a heating mantle and allowed to proceed at this temperature to completion in about 6 hours. The mixture was cooled to about 100° C., and 100 milliliters of toluene and 15 milliliters of water were then added with vigorous stirring. The resulting two phase mixture was transferred into a separatory funnel and the layers separated. The organic phase, which contained the desired product, was washed with water, and treated with 25 grams of alumina under an argon atmosphere, and filtered. The filtrate was then evaporated and the residue was recrystallized from cyclohexane to provide 6.8 grams of pure, about 99.9 percent, 5,11-di-m-tolyl-5,11-dihydroindolo-[3,2-b] carbazole (1).

IR (Kbr): 1,604, 1,588, 1,490, 1,475, 1,450, 1,321, 1,201, 1,153, 760, 745, 701 cm$^{-1}$.

$^1$H-NMR (CDCl$_3$): δ 2.51 (s), 7.18–7.59 (m), 8.05 (s), 8.12 (d, J=8.5 Hz).

EXAMPLE II

Synthesis of 5,11-di-bis(3,4-dimethylphenyl)-m-5,11-dihydroindolo[3,2-b]carbazole (2)

A 200-milliliter 3-necked round bottom flask equipped with a mechanical stirrer, reflux condenser, and argon inlet was purged with argon and then charged with 5,11-dihydroindolo[3,2-b]carbazole (5.1 grams, 0.02 mol), 3-iodotoluene (9.28 grams, 0.04 mol), copper sulfate pentahydrate (0.25 gram, 1.0 mmol), potassium carbonate (5.52 grams, 0.04 mol), and n-tridecane (5.0 milliliters). Under an argon atmosphere, the reaction mixture was heated to about 250° C. with a heating mantle and allowed to proceed at this temperature to completion in about 6 hours. The reaction mixture was cooled to about 100° C., and 100 milliliters of toluene and 15 milliliters of water were then added with vigorous stirring. The resulting two phase mixture was transferred into a separatory funnel and the layers separated. The organic phase was washed with water, treated under argon with 25 grams of alumina, and filtered. The filtrate was evaporated and the residue was recrystallized from cyclohexane to provide 7.5 grams of pure, about 99.8 percent, 5,11-di-bis(3,4-dimethylphenyl)-m-5,11-dihydroindolo[3,2-b]carbazole (2).

IR (Kbr): 1,614, 1,605, 1,511, 1,458, 1,445, 1,324, 1,241, 1,183, 851, 747, 743 cm$^{-1}$.

$^1$H-NMR (CDCl$_3$): δ 2.42 (s), 2.44 (s), 7.14 to 7.47 (m), 8.03 (s), 8.12 (d, J=8.5 Hz).

EXAMPLE III

Synthesis of 5,11-di-1-naphthyl-5,11-dihydroindolo[3,2-b] carbazole (3)

A 200 milliliter 3-necked round bottom flask equipped with a mechanical stirrer, reflux condenser, and argon inlet was purged with argon and then charged with 5,11-dihydroindolo[3,2-b]carbazole (5.1 grams, 0.02 mol), 1-iodonaphthalene (10.16 grams, 0.04 mol), copper sulfate pentahydrate (0.25 gram, 1.0 mmol), potassium carbonate (5.52 grams, 0.04 mol), and n-tridecane (5.0 milliliters). Under an argon atmosphere, the reaction mixture was heated to about 250° C. with a heating mantle and allowed to proceed at this temperature to completion in about 6 hours. The reaction mixture was cooled to about 100° C., and 100 milliliters of toluene and 15 milliliters of water were then added with vigorous stirring for 30 minutes. The resulting two phase mixture was transferred into a separatory funnel and the layers separated. The organic phase which contains the desired product was washed with water, treated with 25 grams of alumina under an argon atmosphere, and filtered. The filtrate was then evaporated and the residue was recrystallized from toluene to provide 2.5 grams of pure, about 99.9 percent, 5,11-di-1-naphthyl-5,11-dihydroindolo[3,2-b] carbazole (3).

IR (Kbr): 1,612, 1,595, 1,576, 1,506, 1,476, 1,468, 1,450, 1,320, 1,293, 1,235, 1,189, 1,147, 803, 775, 746 cm$^{-1}$.

$^1$H-NMR (CDCl$_3$): δ 6.98 (d, J=8.5 Hz), 7.13 to 7.48 (m), 7.54~7.62 (m), 7.71~7.80 (m), 8.0~8.15 (m).

EXAMPLE IV

Synthesis of 5,11-bis[4'-(3-methyldiphenylamino)-1,1'-biphenyl-4-yl]-5,11-dihydroindolo-[3,2-b]carbazole (4)

A 100 milliliter 3-necked round bottom flask equipped with a mechanical stirrer, reflux condenser, and argon inlet was purged with argon, and then charged with 5,11-dihydroindolo[3,2-b]carbazole (1.65 grams, 6.45 mmol), 4-iodo-4'-(3-methyldiphenylamino)-1,1'-biphenyl (7.1 grams, 15.5 mmol), copper sulfate pentahydrate (0.12 grams, 0.5 mmol), potassium carbonate (2.1 grams, 15.2 mmol), and n-tridecane (5.0 milliliters). Under an argon atmosphere, the reaction mixture was heated to about 250° C. with a heating mantle and allowed to proceed at this temperature to completion in about 6 hours. The reaction mixture was cooled to 25° C. to induce precipitation of reaction product. The solid product was filtered, washed with water, and filtered. The crude product was purified by column chromatography on alumina using hot toluene as an eluant to provide 3.45 grams of pure, about 99.9 percent, 5,11-bis[4'-(3-methyldiphenylamino)-1,1'-biphenyl-4-yl]-5,11-dihydroindolo-[3,2-b]carbazole (8).

IR (Kbr): 1,598, 1,495, 1,450, 1,320, 1,291, 1,277, 1,232, 742, 695 cm$^{31\ 1}$.

$^1$H-NMR (DMSO-d$^6$-CDCl$_3$): δ 2.30 (s), 6.88~7.51 (m), 7.66 (d, J=8.6 Hz), 7.76 (d, J=8.6 Hz), 7.93 (d, J=8.6 Hz), 7.99 (s), 8.17 (s), 8.19 (d, J=8.6 Hz).

EXAMPLE IV

A photoconductive imaging member can be prepared by sequentially coating a photogenerator layer and a hole transport layer on a supporting substrate of a titanized MYLAR®, which can be precoated with a thin 0.025 micron silane blocking layer and a thin 0.1 micron polyester adhesive layer. The photogenerating layer can be comprised of a number of photogenerating pigments, such as hydroxygallium phthalocyanine Type V. A dispersion of Type V hydroxygallium phthalocyanine (HOGaPC) can be prepared by milling 0.125 gram of the Type V, and 0.125 gram of polystyrene-b-polyvinylpyridine in 9.0 grams of chlorobenzene in a 30 milliliter glass bottle containing 70 grams of ⅛ inch stainless steel balls. The bottle is placed on a Norton roller mill operating at 300 rpm for 20 hours. The dispersion is then coated on the titanized MYLAR® substrate using 1 mil film applicator to form, it is believed, a photogenerator layer. The formed photogenerating layer HOGaPc is dried at 135° C. for 20 minutes to a final thickness of about 0.3 micron.

A hole transporting layer solution can prepared by dissolving 3 grams of the indolocarbazole, such as those of the above Examples, and 3.5 grams of polycarbonate in 40 grams of dichloromethane. The solution was coated onto the HOGaPc generator layer using a 6 mil film applicator. The charge transporting layer thus obtained was dried at from 100° C. to 135° C. and dried.

The xerographic electrical properties of the imaging members can be determined by known means, including electrostatically charging the surfaces thereof with a corona discharge source until the surface potentials, as measured by a capacitively coupled probe attached to an electrometer, attained an initial value $V_0$, of about −800 volts. After resting for 0.5 second in the dark, the charged members can it is believed attained a surface potential of $V_{ddp}$, dark development potential. The member, when exposed to light from a filtered Xenon lamp with a XBO 150 watt bulb, induced a photodischarge which resulted in a reduction of surface potential to a $V_{bg}$ value, background potential. The percent of photodischarge was calculated as $100 \times (V_{ddp} - V_{bg})/V_{ddp}$. The desired wavelength and energy of the exposed light can be determined by the type of filters placed in front of the lamp. The monochromatic light photosensitivity was determined using a narrow band-pass filter.

When exposing the charged imaging member with the hydroxygallium phthalocyanine and the charge transport of Example 1, 830 nanometers of light at an intensity of 10 ergs/cm², a photodischarge of 75 percent may be observed. The imaging member was fully discharged when it was exposed to both 680 and 830 nanometers of light.

Other modifications of the present invention will occur to those of ordinary skill in the art subsequent to a review of the present application. These modifications and equivalents thereof are intended to be included within the scope of the present invention.

What is claimed is:

1. A photoconductive imaging member comprised of a charge transport layer comprised of an indolocarbazole represented by the Formulas (Ia), (IIa), (IIIa), (IVa), (Va), or (VIa); or optionally mixtures thereof:

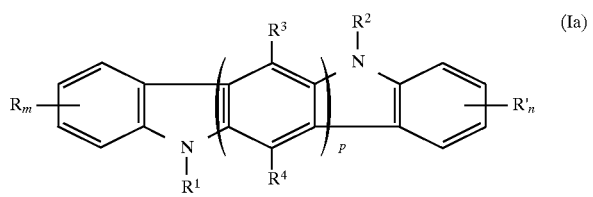

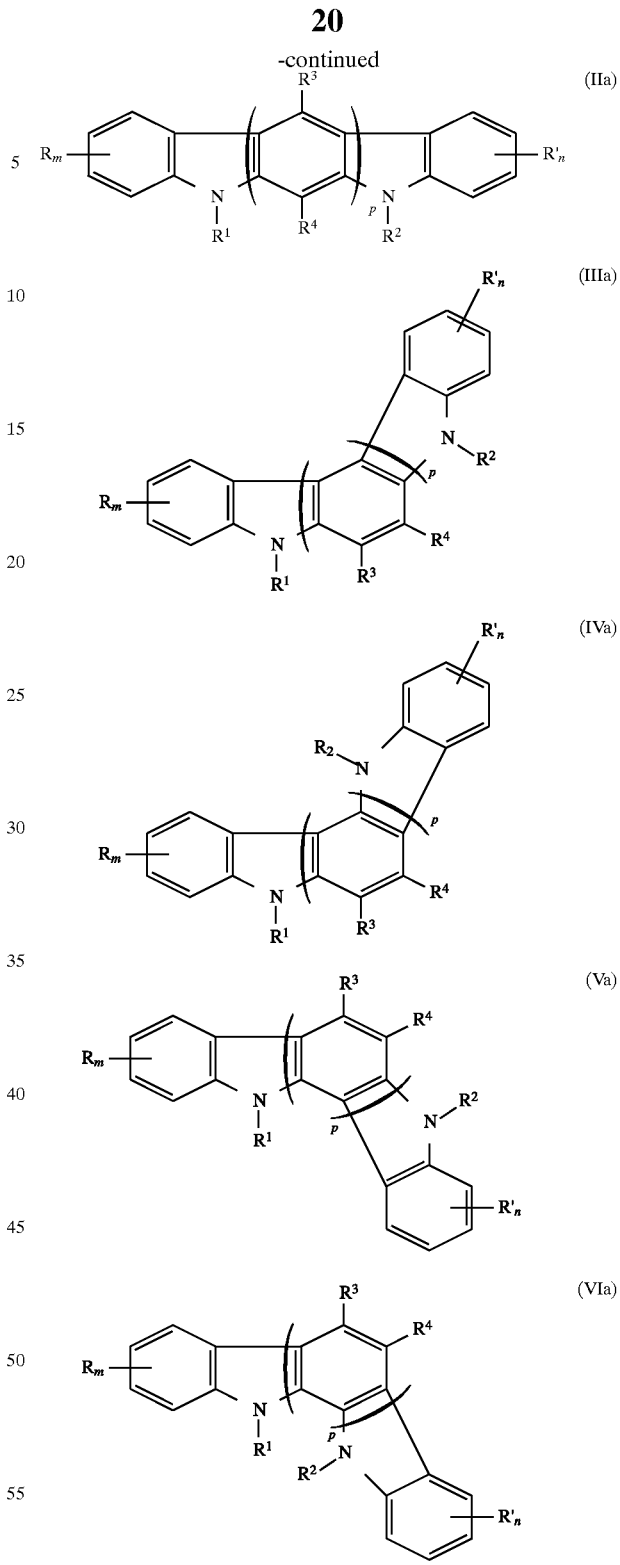

wherein R and R' are independently selected from the group consisting of a hydrogen atom, a halogen atom, alkyl, alkoxyl, and aryl; m and n are numbers of from 0 to 4; $R^1$ and $R^2$ are independently selected from the group consisting of alkyl, aryl, vinyl, and diarylaminoaryl; $R^3$ and $R^4$ are an atom of hydrogen, alkyl, alkoxy, aryl, or halogen, and p is a number of from 1 to 3.

2. A member in accordance with claim 1 wherein aryl is a fused aromatic ring.

3. A member in accordance with claim 2 wherein said fused ring is benzo.

4. A member in accordance with claim 1 wherein alkyl contains from 1 to about 25 carbon atoms, alkoxy contains from 1 to about 25 carbon atoms, and aryl contains from 6 to about 30 carbon atoms.

5. A member in accordance with claim 1 wherein alkyl contains from 1 to about 10 carbon atoms, alkoxy contains from 2 to about 12 carbon atoms, and aryl contains from 6 to about 18 carbon atoms.

6. A member in accordance with claim 1 wherein alkyl contains from 1 to about 6 carbon atoms, and alkoxy contains from 1 to about 6 carbon atoms.

7. A member in accordance with claim 1 wherein alkyl is methyl, ethyl, propyl, butyl, pentyl, heptyl, or hexyl, and wherein alkoxy is methoxy, ethoxy, propoxy, butoxy, pentoxy, or heptoxy.

8. A member in accordance with claim 1 wherein halogen is a chlorine, bromine, fluorine, or iodine atom.

9. A member in accordance with claim 1 wherein aryl is phenyl.

10. A member in accordance with claim 1 wherein m and n are the numbers 1, 2, 3, or 4.

11. A member in accordance with claim 1 wherein R and R' are hydrogen atoms, or alkyl, and $R^1$ and $R^2$ are aryl.

12. A member in accordance with claim 11 wherein $R^3$ and $R^4$ are hydrogen atoms.

13. A member in accordance with claim 1 wherein $R^1$ and $R^2$ are independently selected from the group consisting of phenyl, naphthyl, and biphenyl.

14. A member in accordance with claim 1 wherein $R^1$ or $R^2$ are diarylaminoaryl as represented by Formula (VII):

wherein A is arylene, and $Ar^1$ and $Ar^2$ are aryl.

15. A member in accordance with claim 14 wherein A is selected from the group consisting of phenylene and biphenylene, and $Ar^1$ and $Ar^2$ are aryl groups independently selected from the group consisting of phenyl, tolyl, xylyl, chlorophenyl, alkoxyphenyl, and naphthyl.

16. A member in accordance with claim 1 wherein indolocarbazole (Ia), or (IIa) is selected.

17. A member in accordance with claim 1 wherein said indolocarbazole is 5,11-di-m-tolyl-5,11-dihydroindolo[3,2-b]carbazole, 5,11-bis(3,4-dimethylphenyl)-5,11-dihydroindolo[3,2-b]carbazole, 5,11-di-1-naphthyl-5,11-dihydroindolo[3,2-b]carbazole, 5,11-bis(3-methoxyphenyl)-5,11-dihydroindolo[3,2-b]carbazole, or 5,11-bis[4'-(3-methyldiphenylamino)-1,1'-biphenyl-4-yl]-5,11-dihydroindolo[3,2-b]carbazole.

18. A member in accordance with claim 1 comprised of a supporting substrate, a photogenerating layer, and a charge transport layer, and wherein said charge transport layer is comprised of said indolocarbazoles.

19. A member in accordance with claim 18 wherein said photogenerating layer is comprised of photogenerating components of selenium, metal free phthalocyanines, metal phthalocyanines, hydroxygallium phthalocyanines, perylenes, or titanyl phthalocyanines.

20. A member in accordance with claim 18 wherein said photogenerating layer is situated between the substrate and the charge transport layer, and said charge transport layer components are dispersed in a resin binder.

21. A member in accordance with claim 18 wherein said indolocarbazole is 5,11-di-m-tolyl-5,11-dihydroindolo[3,2-b]carbazole, 5,11-bis(3,4-dimethylphenyl)-5,11-dihydroindolo[3,2-b]carbazole, 5,11-di-1-naphthyl-5,11-dihydroindolo[3,2-b]carbazole, 5,11-diphenyl-5,11-dihydroindolo[3,2-b]carbazole, 5,11-bis-(1,1-biphenyl-4-yl)-5,11-dihydroindolo[3,2-b]carbazole, 5,11-bis(3-methoxyphenyl)-5,11-dihydroindolo[3,2-b]carbazole, 5,11-bis(4-chlorophenyl)-5,11-dihydroindolo[3,2-b]carbazole, 5,11-bis[4'-(3-methyldiphenylamino)-1,1'-biphenyl-4-yl]-5,11-dihydroindolo[3,2-b]carbazole, 5,11-bis[4'-(4-methyldiphenylamino)-1,1'-biphenyl-4-yl]-5,11-dihydroindolo[3,2-b]carbazole, 5,11-bis[4'-(diphenylamino)-1,1'-biphenyl-4-yl]-5,11-dihydroindolo[3,2-b]carbazole, 5,11-bis[4'-(diphenylamino)-1,1'-biphenyl-4-yl]-5,11-dihydroindolo[3,2-b]carbazole, 5,11-bis[4'-(di-p-tolylamino)-1,1'-biphenyl-4-yl]-5,11-dihydroindolo[3,2-b]carbazole, 5,11-bis[4'-(3,4-dimethyldiphenylamino)-1,1'-biphenyl-4-yl]-5,11-dihydroindolo[3,2-b]carbazole, 5,11-bis[4'-(3-methoxydiphenylamino)-1,1'-biphenyl-4-yl]-5,11-dihydroindolo[3,2-b]carbazole, 5,11-bis[4'-(3-chlorodiphenylamino)-1,1'-biphenyl-4-yl]-5,11-dihydroindolo[3,2-b]carbazole, 5,11-bis[4'-(4-chlorodiphenylamino)-1,1'-biphenyl-4-yl]-5,11-dihydroindolo[3,2-b]carbazole, 5,11-bis[4'-(diphenylamino)-1,1'-biphenyl-4-yl]-2,8-dimethyl-5,11-dihydroindolo[3,2-b]carbazole, 5,11-bis[4'-(4-methyldiphenylamino)-1,1'-biphenyl-4-yl]-2,8-dimethyl-5,11-dihydroindolo[3,2-b]carbazole, 5,11-bis[4-(diphenylamino)phenyl]-5,11-dihydroindolo[3,2-b]carbazole, 5,11-bis[4-(3-methyldiphenylamino)phenyl]-5,11-dihydroindolo[3,2-b]carbazole, 5,11-bis[4-(4-methyldiphenylamino)phenyl]-5,11-dihydroindolo[3,2-b]carbazole, 5,11-bis[4-(diphenylamino)phenyl]-2,8-dimethyl-5,11-dihydroindolo[3,2-b]carbazole, 5,11-bis[4-(4-methyldiphenylamino)phenyl]-2,8-dimethyl-5,11-dihydroindolo[3,2-b]carbazole, 5,11-bis[4-(1-naphthylphenylamino)phenyl]-5,11-dihydroindolo[3,2-b]carbazole, 5,7 -di-m-tolyl-5,7-dihydroindolo[2,3-b]carbazole, 5,7-bis(3,4-dimethylphenyl)-5,7-dihydroindolo[2,3-b]carbazole, 5,7-di-1-naphthyl-5,7-dihydroindolo[2,3-b]carbazole, 5,7-diphenyl-5,7-dihydroindolo[2,3-b]carbazole, 5,7-bis-(1,1-biphenyl-4-yl)-5,7-dihydroindolo[2,3-b]carbazole, 5,7-bis(3-methoxyphenyl)-5,7-dihydroindolo[2,3-b]carbazole, 5,7-bis[4'-(3-methyldiphenylamino)-1,1'-biphenyl-4-yl]-5,7-dihydroindolo[2,3-b]carbazole, 5,7-bis[4'-(diphenylamino)-1,1'-biphenyl-4-yl]-5,7-dihydroindolo[2,3-b]carbazole, 5,7-bis[4'-(di-p-tolylamino)-1,1'-biphenyl-4-yl]-5,7-dihydroindolo[2,3-b]carbazole, 5,7-bis[4'-(diphenylamino)-1,1'-biphenyl-4-yl]-2,10-dimethyl-5,7-dihydroindolo[2,3-b]carbazole, 5,7-bis[4-(diphenylamino)phenyl]-5,7-dihydroindolo[2,3-b]carbazole, 5,7-bis[4-(3-methyldiphenylamino)phenyl]-5,7-dihydroindolo[2,3-b]carbazole, 5,8-diphenyl-5,8-dihydroindolo[2,3-c]carbazole, 5,8-di-m-tolyl-5,8-dihydroindolo[2,3-c]carbazole, 5,8-bis-(1,1-biphenyl-4-yl)-5,8-dihydroindolo[2,3-c]carbazole, 5,8-di-1-naphthyl-5,8-dihydroindolo[2,3-c]carbazole, 5,8-bis-[4-(3-methyldiphenylamino)phenyl]-5,8-dihydroindolo[2,3-c]carbazole, 5,8-bis[4'-(3-methyldiphenylamino)-1,1'-biphenyl-4-yl]-5,8-dihydroindolo[2,3-c]carbazole, 5,10-diphenyl-5,10-dihydroindolo[3,2-a]carbazole, 5,10-di-m-tolyl-5,10-dihydroindolo[3,2-a]carbazole, 5,10-bis-(1,1-biphenyl-4-yl)-5,10-dihydroindolo[3,2-a]carbazole, 5,10-di-1-naphthyl-5,10-dihydroindolo[3,2-a]carbazole, 5,10-bis-[4-(3-methyldiphenylamino)phenyl]-5,10-dihydroindolo[3,2-a]carbazole, 5,12-diphenyl-5,12-dihydroindolo[3,2-c]carbazole, 5,12-di-m-tolyl-5,12-dihydroindolo[3,2-c]carbazole, 5,12-bis-(1,1-biphenyl-4-yl)-5,12-dihydroindolo[3,2-c]carbazole, 5,12-di-1-naphthyl-5,12-dihydroindolo[3,2-c]carbazole, 5,12-bis-[4-(3- methyldiphenylamino)phenyl]-5,12-dihydroindolo[3,2-c] carbazole, 5,12-bis[4'-(3-methyldiphenylamino)-1,1'-biphenyl-4-yl]-5,12-dihydroindolo[3,2-c]carbazole, 11,12-diphenyl-11,12-dihydroindolo[2,3-a]carbazole, 11,12-di-m-tolyl-11,12-dihydroindolo[2,3-a]carbazole, 11,12-di-p-tolyl-11,12-dihydroindolo[2,3-a]carbazole, (3-methoxyphenyl)-5,7-dihydroindolo[2,3-b]carbazole, 5,7-bis[4'-(3-methyldiphenylamino)-1,1'-biphenyl-4-yl]-5,7-dihydroindolo[2,3-b]carbazole, 5,7-bis[4'-(diphenylamino)-1,1'-biphenyl-4-yl]-5,7-dihydroindolo[2,3-b]carbazole, 5,7-bis[4'-(di-p-tolylamino)-1,1"-biphenyl-4-yl]-5,7-dihydroindolo[2,3-b]carbazole, 5,7-bis[4'-(diphenylamino)-1,1'-biphenyl-4-yl]-2,10-dimethyl-5,7-dihydroindolo[2,3-b] carbazole, 5,7-bis[4-(diphenylamino)phenyl]-5,7-dihydroindolo[2,3-b]carbazole, 5,7-bis[4-(3-methyldiphenylamino)phenyl]-5,7-dihydroindolo[2,3-b] carbazole, 5,8-diphenyl-5,8-dihydroindolo[2,3-c]carbazole, 5,8-di-m-tolyl-5,8-dihydroindolo[2,3-c]carbazole, 5,8-bis-(1,1-biphenyl-4-yl)-5,8-dihydroindolo[2,3-c]carbazole, 5,8-di-1-naphthyl-5,8-dihydroindolo[2,3-c]carbazole, 5,8-bis-[4-(3-methyldiphenylamino)phenyl]-5,8-dihydroindolo[2,3-c]carbazole, 5,8-bis[4'-(3-methyldiphenylamino)-1,1'-biphenyl-4-yl]-5,8-dihydroindolo[2,3-c]carbazole, 5,10-diphenyl-5,10-dihydroindolo[3,2-a]carbazole, 5,10-di-m-tolyl-5,10-dihydroindolo[3,2-a]carbazole, 5,10-bis-(1,1-biphenyl-4-yl)-5,10-dihydroindolo[3,2-a]carbazole, 5,10-di-1-naphthyl-5,10-dihydroindolo[3,2-a]carbazole, 5,10-bis-[4-(3-methyldiphenylamino)phenyl]-5,10-dihydroindolo[3,2-a]carbazole 5,12-diphenyl-5,12-dihydroindolo[3,2-c]carbazole, 5,12-di-m-tolyl-5,12-dihydroindolo[3,2-c]carbazole, 5,12-bis-(1,1-biphenyl-4-yl)-5,12-dihydroindolo[3,2-c]carbazole, 5,12-di-1-naphthyl-5,12-dihydroindolo[3,2-c]carbazole, 5,12-bis-[4-(3-methyldiphenylamino)phenyl]-5,12-dihydroindolo[3,2-c] carbazole, 5,12-bis[4'-(3-methyldiphenylamino)- ,1'-biphenyl-4-yl]-5,12-dihydroindolo[3,2-c]carbazole, 11,12-diphenyl-11,12-dihydroindolo[2,3-a]carbazole, 11,12-di-m-tolyl-11,12-dihydroindolo[2,3-a]carbazole, or 11,12-di-p-tolyl-11,12-dihydroindolo[2,3-a]carbazole.

22. An imaging member in accordance with claim 18 wherein the supporting substrate is comprised of a conductive substrate, or a polymer, the photogenerator layer has a thickness of from about 0.05 to about 10 microns, the indolocarbazole transport layer has a thickness of from about 5 to about 30 microns, and wherein the photogenerating layer components are optionally dispersed in a resinous binder in an amount of from about 5 percent by weight to about 95 percent by weight.

23. A photoconductive imaging member comprised of a supporting substrate, a photogenerating layer, and a charge transport layer, and wherein said charge transport layer is comprised of an indolocarbazole represented by the Formulas (Ia), (IIa), (IIIa), (IVa), (Va), or (VIa):

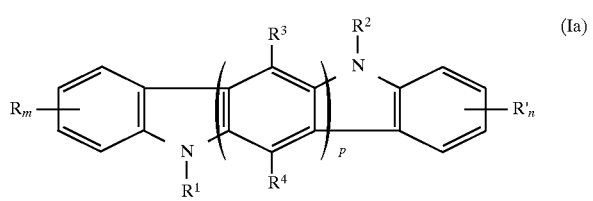

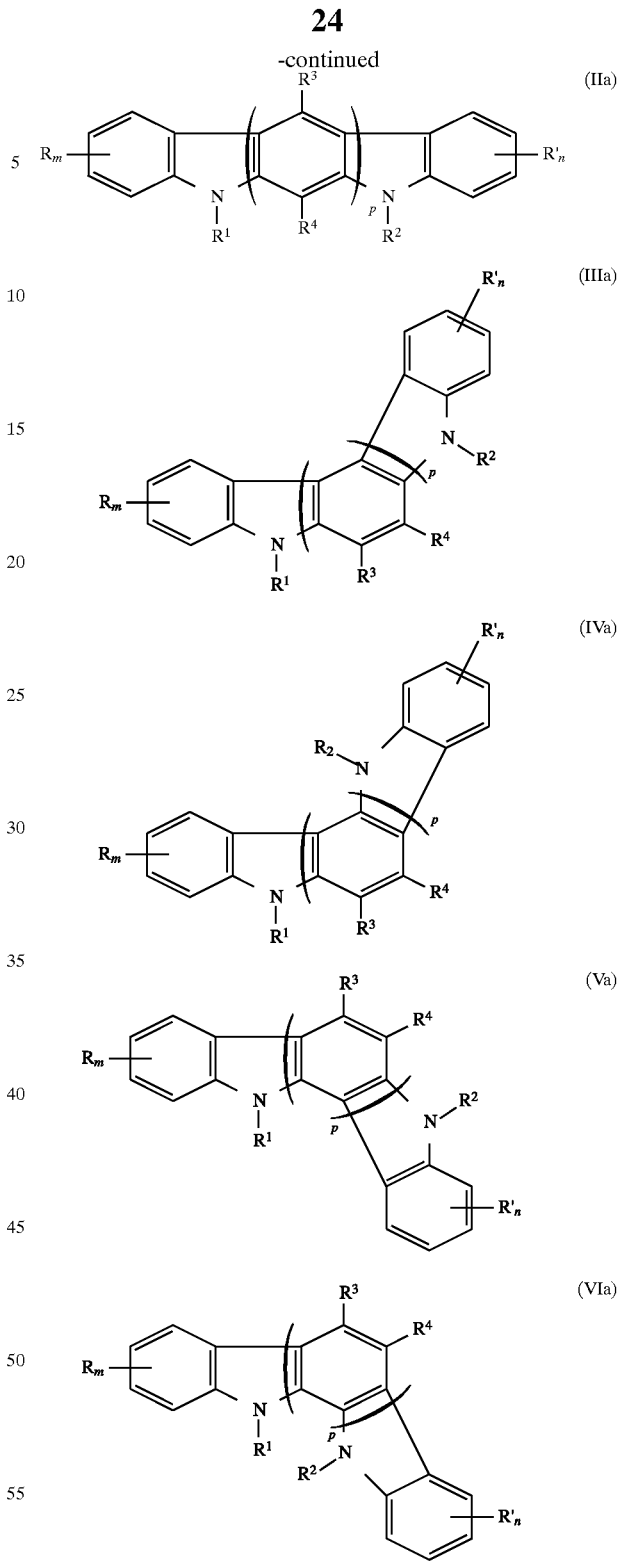

wherein R and R' are independently selected from the group consisting of a hydrogen atom, a halogen atom, alkyl, alkoxyl, and aryl; m and n are numbers; $R^1$ and $R^2$ are independently selected from the group consisting of alkyl, aryl, and diarylaminoaryl; $R^3$ and $R^4$ are an atom of hydrogen, alkyl, alkoxy, aryl, or halogen, and p is a number.

24. A photoconductive imaging member in accordance with claim 1 wherein said indolocarbazole is 5,11-dihydroindolo[3,2-b]carbazole.

25. A photoconductive imaging member in accordance with claim 18 wherein said hydroxygallium phthalocyanine is hydroxygallium phthalocyanine Type V.

26. A photoconductive imaging member in accordance with claim 18 further including a blocking layer and an adhesive layer.

27. A photoconductive imaging member in accordance with claim 26 wherein said blocking layer is a silane, and said adhesive layer is a polyester.

28. A photoconductive imaging member comprised of a charge transport layer comprised of an indolocarbazole represented by the Formulas (Ia), (IIa), (IIIa), (IVa), (Va), or (VIa); or optionally mixtures thereof:

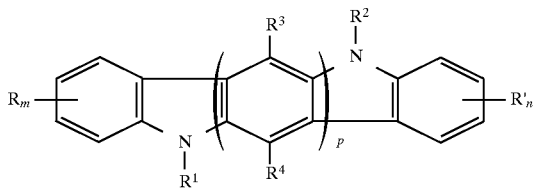
(Ia)

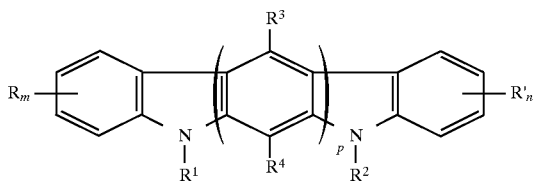
(IIa)

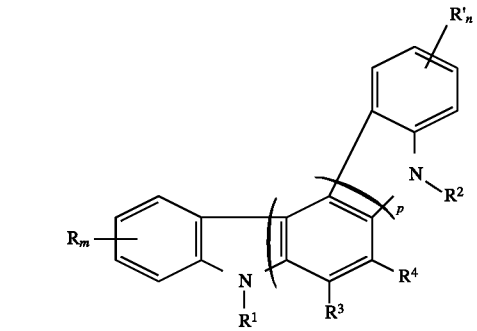
(IIIa)

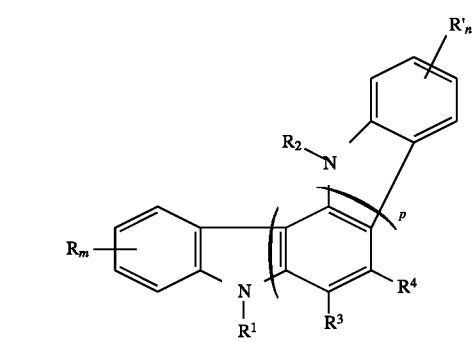
(IVa)

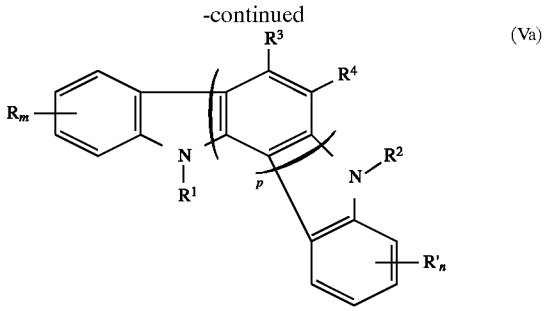
(Va)

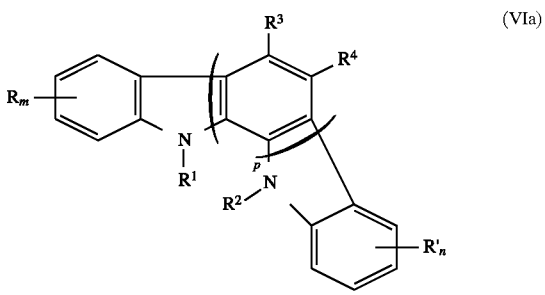
(VIa)

wherein R and R' are independently selected from the group consisting of a hydrogen, halogen, alkyl, alkoxyl, and aryl; m and n are numbers of from 0 to 4; $R^1$ and $R^2$ are independently selected from the group consisting of alkyl, aryl, vinyl, and diarylaminoaryl; $R^3$ and $R^4$ are hydrogen, alkyl, alkoxy, aryl, or halogen, and p is a number.

29. A photoconductive imaging member comprised of a photogenerating layer and indolocarbazole charge transport layer, and wherein said indolocarbazole is selected from the group consisting of 5,11-di-m-tolyl-5,11-dihydroindolo[3,2-b]carbazole, 5,11-bis(3,4-dimethylphenyl)-5,11-dihydroindolo[3,2-b]carbazole, 5,11-di-1-naphthyl-5,11-dihydroindolo[3,2-b]carbazole, 5,11-diphenyl-5,11-dihydroindolo[3,2-b]carbazole, 5,11-bis-(1,1-biphenyl-4-yl)-5,11-dihydroindolo[3,2-b]carbazole, 5,11-bis(3-methoxyphenyl)-5,11-dihydroindolo[3,2-b]carbazole, 5,11-bis(4-chlorophenyl)-5,11-dihydroindolo[3,2-b]carbazole, 5,11-bis[4'-(3-methyldiphenylamino)-1,1'-biphenyl-4-yl]-5,11-dihydroindolo[3,2-b]carbazole, 5,11-bis[4'-(4-methyldiphenylamino)-1,1'-biphenyl-4-yl]-5,11-dihydroindolo[3,2-b]carbazole, 5,11-bis[4'-(diphenylamino)-1,1'-biphenyl-4-yl]-5,11-dihydroindolo[3,2-b]carbazole, 5,11-bis[4'-(diphenylamino)-1,1'-biphenyl-4-yl]-5,11-dihydroindolo[3,2-b]carbazole, 5,11-bis[4'-(di-p-tolylamino)-1,1'-biphenyl-4-yl]-5,11-dihydroindolo[3,2-b]carbazole, 5,11-bis[4'-(3,4-dimethyldiphenylamino)-1,1'-biphenyl-4-yl]-5,11-dihydroindolo[3,2-b]carbazole, 5,11-bis[4'-(3-methoxy diphenylamino)-1,1'-biphenyl-4-yl-5,11-dihydroindolo[3,2-b]carbazole, 5,11-bis[4'-(3-chlorodiphenylamino)-1,1'-biphenyl-4-yl]-5,11-dihydroindolo[3,2-b]carbazole, 5,11-bis[4'-(4-chlorodiphenylamino)-1,1'-biphenyl-4-yl]-5,11-dihydroindolo[3,2-b]carbazole, 5,11-bis[4'-(diphenylamino)-1,1'-biphenyl-4-yl]-2,8-dimethyl-5,11-dihydroindolo[3,2-b]carbazole, 5,11-bis[4'-(4-methyldiphenylamino)-1,1'-biphenyl-4-yl]-2,8-dimethyl-5,11-dihydroindolo[3,2-b]carbazole, 5,11-bis[4-(diphenylamino)phenyl]-5,11-dihydroindolo[3,2-b]carbazole, 5,11-bis[4-(3-methyldiphenylamino)phenyl]-5,11-dihydroindolo[3,2-b]carbazole, 5,11-bis[4-(4-methyldiphenylamino)phenyl]-5,11-dihydroindolo[3,2-b]carbazole, 5,11-bis[4-(diphenylamino)phenyl]-2,8-dimethyl-5,11-dihydroindolo

[3,2-b]carbazole, 5,11-bis[4-(4-methyldiphenylamino)phenyl]-2,8-dimethyl-5,11-dihydroindolo[3,2-b]carbazole, 5,11-bis[4-(1-naphthylphenylamino)phenyl]-5,11-dihydroindolo[3,2-b]carbazole, 5,7-di-m-tolyl-5,7-dihydroindolo[2,3-b]carbazole, 5,7-bis(3,4-dimethylphenyl)-5,7-dihydroindolo[2,3-b]carbazole, 5,7-di-1-naphthyl-5,7-dihydroindolo[2,3-b]carbazole, 5,7-diphenyl-5,7-dihydroindolo[2,3-b]carbazole, 5,7-bis-(1,1-biphenyl-4-yl)-5,7-dihydroindolo[2,3-b]carbazole, 5,7-bis(3-methoxyphenyl)-5,7-dihydroindolo[2,3-b]carbazole, 5,7-bis[4'-(3-methyldiphenylamino)-1,1'-biphenyl-4-yl]-5,7-dihydroindolo[2,3-b]carbazole, 5,7-bis[4'-(diphenylamino)-1,1'-biphenyl-4-yl]-5,7-dihydroindolo[2,3-b]carbazole, 5,7-bis[4'-(di-p-tolylamino)-1,1'-biphenyl-4-yl]-5,7-dihydroindolo[2,3-b]carbazole, 5,7-bis[4'-(diphenylamino)-1,1'-biphenyl-4-yl]-2,10-dimethyl-5,7-dihydroindolo[2,3-b]carbazole, 5,7-bis[4-(diphenylamino)phenyl]-5,7-dihydroindolo[2,3-b]carbazole, 5,7-bis[4-(3-methyldiphenylamino)phenyl]-5,7-dihydroindolo[2,3-b]carbazole, 5,8-diphenyl-5,8-dihydroindolo[2,3-c]carbazole, 5,8-di-m-tolyl-5,8-dihydroindolo[2,3-c]carbazole, 5,8-bis-(1,1-biphenyl-4-yl)-5,8-dihydroindolo[2,3-c]carbazole, 5,8-di-1-naphthyl-5,8-dihydroindolo[2,3-c]carbazole, 5,8-bis-[4-(3-methyldiphenylamino)phenyl]-5,8-dihydroindolo[2,3-c]carbazole, 5,8-bis[4'-(3-methyldiphenylamino)-1,1'-biphenyl-4-yl]-5,8-dihydroindolo[2,3-c]carbazole, 5,10-diphenyl-5,10-dihydroindolo[3,2-a]carbazole, 5,10-di-m-tolyl-5,10-dihydroindolo[3,2-a]carbazole, 5,10-bis-(1,1-biphenyl-4-yl)-5,10-dihydroindolo[3,2-a]carbazole, 5,10-di-1-naphthyl-5,10-dihydroindolo[3,2-a]carbazole, 5,10-bis-[4-(3-methyldiphenylamino)phenyl]-5,10-dihydroindolo[3,2-a]carbazole, 5,12-diphenyl-5,12-dihydroindolo[3,2-c]carbazole, 5,12-di-m-tolyl-5,12-dihydroindolo[3,2-c]carbazole, 5,12-bis-(1,1-biphenyl-4-yl)-5,12-dihydroindolo[3,2-c]carbazole, 5,12-di-1-naphthyl-5,12-dihydroindolo[3,2-c]carbazole, 5,12-bis-[4-(3-methyldiphenylamino)phenyl]-5,12-dihydroindolo[3,2-c]carbazole, 5,12-bis[4'-(3-methyldiphenylamino)-1,1'-biphenyl-4-yl]-5,12-dihydroindolo[3,2-c]carbazole, 11,12-diphenyl-11,12-dihydroindolo[2,3-a]carbazole, 11,12-di-m-tolyl-11,12-dihydroindolo[2,3-a]carbazole, 11,12-di-p-tolyl-11,12-dihydroindolo[2,3-a]carbazole, (3-methoxyphenyl)-5,7-dihydroindolo[2,3-b]carbazole, 5,7-bis[4'-(3-methyldiphenylamino)-1,1'-biphenyl-4-yl]-5,7-dihydroindolo[2,3-b]carbazole, 5,7-bis[4'-(diphenylamino)-1,1'-biphenyl-4-yl]-5,7-dihydroindolo[2,3-b]carbazole, 5,7-bis[4'-(di-p-tolylamino)-1,1"-biphenyl-4-yl]-5,7-dihydroindolo[2,3-b]carbazole, 5,7-bis[4'-(diphenylamino)-1,1'-biphenyl-4-yl]-2,10-dimethyl-5,7-dihydroindolo[2,3-b]carbazole, 5,7-bis[4-(diphenylamino)phenyl]-5,7-dihydroindolo[2,3-b]carbazole, 5,7-bis[4-(3-methyldiphenylamino)phenyl]-5,7-dihydroindolo[2,3-b]carbazole, 5,8-diphenyl-5,8-dihydroindolo[2,3-c]carbazole, 5,8-di-m-tolyl-5,8-dihydroindolo[2,3-c]carbazole, 5,8-bis-(1,1-biphenyl-4-yl)-5,8-dihydroindolo[2,3-c]carbazole, 5,8-di-1-naphthyl-5,8-dihydroindolo[2,3-c]carbazole, 5,8-bis-[4-(3-methyldiphenylamino)phenyl]-5,8-dihydroindolo[2,3-c]carbazole, 5,8-bis[4'-(3-methyldiphenylamino)-1,1'-biphenyl-4-yl]-5,8-dihydroindolo[2,3-c]carbazole, 5,10-diphenyl-5,10-dihydroindolo[3,2-a]carbazole, 5,10-di-m-tolyl-5,10-dihydroindolo[3,2-a]carbazole, 5,10-bis-(1,1-biphenyl-4-yl)-5,10-dihydroindolo[3,2-a]carbazole, 5,10-di-1-naphthyl-5,10-dihydroindolo[3,2-a]carbazole, 5,10-bis-[4-(3-methyldiphenylamino)phenyl]-5,10-dihydroindolo[3,2-a]carbazole 5,12-diphenyl-5,12-dihydroindolo[3,2-c]carbazole, 5,12-di-m-tolyl-5,12-dihydroindolo[3,2-c]carbazole, 5,12-bis-(1,1-biphenyl-4-yl)-5,12-dihydroindolo[3,2-c]carbazole, 5,12-di-1-naphthyl-5,12-dihydroindolo[3,2-c]carbazole, 5,12-bis-[4-(3-methyldiphenylamino)phenyl]-5,12-dihydroindolo[3,2-c]carbazole, 5,12-bis[4'-(3-methyldiphenylamino)-1,1'-biphenyl-4-yl]-5,12-dihydroindolo[3,2-c]carbazole, 11,12-diphenyl-11,12-dihydroindolo[2,3-a]carbazole, 11,12-di-m-tolyl-11,12-dihydroindolo[2,3-a]carbazole, or 11,12-di-p-tolyl-11,12-dihydroindolo[2,3-a]carbazole.

\* \* \* \* \*